US010486500B2

(12) United States Patent
Kim et al.

(10) Patent No.: US 10,486,500 B2
(45) Date of Patent: Nov. 26, 2019

(54) CENTRALIZED ENERGY MODULE FOR VEHICLE (71) Applicants: Hyundai Motor Company, Seoul (KR); Kia Motors Corporation, Seoul (KR)

(72) Inventors: Jae Yeon Kim, Hwaseong-si (KR); Yeon Ho Kim, Seoul (KR); Myunghwan Kim, Hwaseong-si (KR); Wan Je Cho, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 141 days.

(21) Appl. No.: 15/802,267

(22) Filed: Nov. 2, 2017

(65) Prior Publication Data

US 2019/0001789 A1 Jan. 3, 2019

(30) Foreign Application Priority Data

Jun. 30, 2017 (KR) .................. 10-2017-0083132

(51) Int. Cl.
*B60H 1/32* (2006.01)
*B60H 1/00* (2006.01)

(52) U.S. Cl.
CPC ....... *B60H 1/3229* (2013.01); *B60H 1/00385* (2013.01); *B60H 1/3223* (2013.01); *B60H 1/3227* (2013.01); *B60H 2001/006* (2013.01)

(58) Field of Classification Search
CPC ............... B60H 1/3229; B60H 1/3227; B60H 1/00385; B60H 1/3223; B60H 1/00899;
(Continued)

(56) References Cited

U.S. PATENT DOCUMENTS 5,910,157 A 6/1999 Noda
6,230,508 B1 5/2001 Baker et al.
(Continued)

FOREIGN PATENT DOCUMENTS

| CN | 203442980 U | * | 2/2014 |
| KR | 10-2004-0094399 A | | 11/2004 |
| KR | 20070108306 A | * | 11/2007 |
| KR | 10-2012-0014621 A | | 2/2012 |
| KR | 10-1186555 B1 | | 9/2012 |

OTHER PUBLICATIONS

Anderson et al., "R-152a Mobile A/C System, EPA Supports Innovation," *SAE Automotive Systems Symposium* (2002).
(Continued)

*Primary Examiner* — Emmanuel E Duke
(74) *Attorney, Agent, or Firm* — Morgan, Lewis & Bockius LLP (57) ABSTRACT A centralized energy (CE) module for a vehicle may include a base plate; a compressor mounted on the base plate and compressing a refrigerant; a condenser mounted on the base plate at a location distanced from the compressor and exchanges heat between the compressed refrigerant supplied from the compressor with cooling water which flows into the condenser to condense the refrigerant; and an evaporator mounted on the base plate at a location distanced from the condenser and evaporating the refrigerant supplied from an expansion valve, integrally mounted, through heat transfer with the cooling water which flows into the evaporator and supplies the evaporated refrigerant to the compressor.

15 Claims, 11 Drawing Sheets (58) Field of Classification Search
CPC ............ B60H 1/00278; B60H 1/00342; B60H 2001/006; F25B 39/04; F25B 13/00; F25B 25/005; F25B 40/00; F25F 41/003
See application file for complete search history.

(56) References Cited

U.S. PATENT DOCUMENTS

| | | | |
|---|---|---|---|
| 8,517,087 B2 | 8/2013 | Zeigler et al. | |
| 2005/0235674 A1* | 10/2005 | Ozaki | B64D 11/00 62/295 |
| 2010/0058800 A1* | 3/2010 | Setoguchi | F25B 13/00 62/513 |
| 2014/0102682 A1* | 4/2014 | Kim | F28F 9/00 165/164 |
| 2017/0167761 A1* | 6/2017 | Ikeda | F25B 13/00 |

OTHER PUBLICATIONS

Hwang and Radermacher, "Experimental Cooling and Energy Performance of Motor Vehicle AC Using HFC-152A," *University of Maryland CEEE*, Paper #15TMSS-0042.
Peng and Du, "Progress in Heat Pump Air Conditioning Systems for Electric Vehicles—A Review," *Energies*, vol. 9:240, pp. 1-17 (2016).
Wang et al., "Review of secondary loop refrigeration systems," *International Journal of Refrigeration*, vol. 33, pp. 212-234 (2010).
Weissler, Paul, "Secondary loop and heat pump climate control under evaluation once more," *SAE International*, pp. 1-2 (2015).

* cited by examiner

CENTRALIZED ENERGY MODULE FOR VEHICLE

CROSS-REFERENCE(S) TO RELATED APPLICATIONS

The present application claims priority to Korean Patent Application No. 10-2017-0083132, filed on Jun. 30, 2017, the entire contents of which is incorporated herein for all purposes by the present reference.

BACKGROUND OF THE INVENTION

Field of the Invention

The present invention relates to a centralized energy (CE) module for a vehicle, and more particularly, to a centralized energy (CE) module for a vehicle which cools or heats an internal of the vehicle using high-temperature cooling water and low-temperature cooling water by selectively exchanging thermal energy with phase-changed refrigerant and cooling water of which phases are changed while being circulated in an internal portion of the CE module.

Description of Related Art

In general, an air conditioner for an automobile includes an air conditioner system configured for circulating a refrigerant to heat or cool an internal of the automobile.

Such an air conditioner system which maintains a comfortable internal environment by keeping a temperature of the internal of the automobile at an appropriate range, regardless of an external temperature change, is configured to heat or cool the internal of the automobile by thermal energy-exchange by an evaporator while the refrigerant discharged by driving a compressor passes through a condenser, a receiver drier, an expansion valve, and the evaporator then circulates to the compressor again.

That is, in the air conditioner means, high-temperature high-pressure gaseous refrigerant compressed by the compressor is condensed through the condenser and thereafter, evaporated in the evaporator through the receiver drier and the expansion valve to lower a temperature and humidity of the internal in a summer cooling mode.

In recent years, as interest in energy efficiency and environmental pollution problem has been increasing, there has been a demand for the development of environmentally friendly vehicles configured to substantially replace internal combustion engine vehicles. The environmentally friendly vehicles are usually fuel cells or electric vehicles driven by electricity or a hybrid vehicle driven by an engine and a battery.

Among the environmentally friendly vehicles, the electric vehicle and the hybrid vehicle do not use a separate heater unlike an air conditioner of a general vehicle and the air conditioner applied to the environmentally friendly vehicle is generally referred to as a heat pump system.

On the other hand, in the case of the electric vehicle, chemical reaction energy of oxygen and hydrogen is converted into electrical energy to generate a driving force. In the present process, since thermal energy is generated by the chemical reaction in the fuel cell, effectively removing the generated heat is essential for securing optimal performance of the fuel cell.

In addition, even in the hybrid vehicle, a motor is driven using electricity supplied from the fuel cell, or an electric battery, together with an engine that operates by general fuel combustion to generate the driving force, and as a result, the performance of the motor can be secured only by effectively removing the heat generated from the fuel cell or the battery and the motor.

As a result, in the hybrid vehicle or the electric vehicle in the related art, a battery cooling system needs to be separately formed with a separate sealing circuit together with a cooler device and the heat pump system to prevent excessive heat generation in the motor, electric components, and the battery including the fuel cell.

Accordingly, a size and a weight of a cooling module disposed in a front portion of the vehicle increase, and a layout of connection pipes that supply the refrigerant and the cooling water to the heat pump system, the cooler, and the battery cooling system is complicated in an engine compartment.

Furthermore, the battery cooling system is separately provided, which warms up or cools the battery according to a status of the vehicle for the battery to provide optimal performance, and as a result, multiple valves for connection with the respective connection pipes are adopted and noise and vibration due to frequent opening and closing operations of the valves are transferred to the internal of the vehicle, degrading a ride comfort.

The information disclosed in this Background of the Invention section is only for enhancement of understanding of the general background of the invention and should not be taken as an acknowledgement or any form of suggestion that this information forms the prior art already known a person skilled in the art.

BRIEF SUMMARY

Various aspects of the present invention are directed to providing a CE module for a vehicle, which selectively transfers thermal energy generated from refrigerant when the refrigerant is condensed and evaporated, and controls a temperature of an internal of a vehicle using each of a low-temperature or a high-temperature cooling water which has undergone thermal transfer.

Various exemplary embodiments of the present invention are directed to providing a CE module for a vehicle, including: a base plate; a compressor mounted on the base plate and compressing a refrigerant; a condenser mounted on the base plate at a location distanced from the compressor and exchanges thermal energy between the compressed refrigerant supplied from the compressor with cooling water which flows into the condenser to condense the refrigerant; and an evaporator, mounted on the base plate at a location distanced from the condenser, and evaporating the refrigerant supplied from an expansion valve, which is integrally mounted, through heat-transfer with the cooling water which flows into the evaporator, and supplying the evaporated refrigerant to the compressor.

In the evaporator, an overcooling heat exchange device may be integrally provided, which overcools the refrigerant supplied from the condenser through mutual heat-transfer with low-temperature low-pressure gaseous refrigerant passing through the evaporator, and supplies the overcooled refrigerant to the expansion valve.

The condenser may include a condensing device having multiple first and second paths disposed alternatively to each other, respectively therein by stacking multiple plates and exchanging heat between the refrigerant passing through the first paths and the cooling water passing through the second paths.

The condenser may be connected to a receiver drier device for gas-liquid separation of the refrigerant condensed while passing through an internal portion of the condenser and removing moisture of the refrigerant.

The compressor may be connected to the condenser through a first connection pipe, the condenser may be connected to the receiver drier device through second and third connection pipes, the condenser may be connected to the overcooling heat exchange device through a fourth connection pipe, and the expansion valve may be connected to the overcooling heat exchange device through a fifth connection pipe and connected to the compressor through a sixth connection pipe.

The evaporator may include an evaporating device having multiple third and fourth paths disposed alternatively to each other therein by stacking multiple plates and exchanging heat between the refrigerant passing through the third paths and the cooling water passing through the fourth paths.

The overcooling heat exchange device may be integrally formed in the evaporating device and has multiple fifth and sixth paths disposed alternatively to each other, respectively therein by stacking multiple plates.

The overcooling heat exchange device may flow low-temperature low-pressure gaseous refrigerant supplied from the evaporating device to the sixth paths, and flow the condensed refrigerant supplied from the condenser to the fifth paths.

The condenser may further include a sub-condensing device having multiple seventh and eighth paths disposed alternatively to each other therein by integrally stacking multiple plates and exchanging heat between the refrigerant passing through the seventh paths and the cooling water passing through the eighth paths.

The cooling water which flows into the condenser may first pass through the sub-condensing device and thereafter, flows into the condensing device.

The refrigerant discharged from the condenser may pass through the overcooling heat exchange device and thereafter, flows into the evaporator through the expansion valve.

The evaporator and the condenser may be connected to each other through cooling water pipes wherein the cooling water flows into and is discharged from the evaporator and the condenser, and the respective cooling water pipes may be connected to a heating, ventilation, and air conditioning (HVAC) module.

High-temperature cooling water, which transfers heat while passing through the condenser, may be supplied to the HVAC module to heat an internal of a vehicle when a heating mode of the vehicle is actuated.

Low-temperature cooling water, which transfer heat while passing through the evaporator, may be supplied to the HVAC module to cool the internal of the vehicle when a cooling mode of the vehicle is actuated.

The condenser and the evaporator may be formed as a water-cooled heat exchanger in which the cooling water is circulated.

The refrigerant may be R152-a or R744 refrigerant.

On the base plate, a cover housing may be mounted wherein the compressor, the condenser, and the evaporator are disposed in the cover housing.

A damper may be mounted between the base plate and the compressor.

According to an exemplary embodiment of the present invention, a CE module for a vehicle selectively transfers thermal energy generated from a refrigerant when the refrigerant is condensed and evaporated and controls a temperature of an internal of a vehicle using each of a low-temperature or a high-temperature cooling water which is subjected to heat transfer, simplifying a whole system and a layout of a connection pipe in which the refrigerant is circulated.

Furthermore, the CE module for a vehicle can enhance operation efficiency using high-performance R152-a or R744 refrigerant and prevent noise, vibration, and operational instability when compared to an air conditioner device in the related art.

Furthermore, manufacturing cost can be reduced and a weight can be reduced through modularization of an apparatus, and spatial utilization can be enhanced.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, throughout the specification, unless explicitly described to the contrary, the word "comprise" and variations including "comprises" or "comprising", will be understood to imply the inclusion of stated elements but not the exclusion of any other elements.

In addition, the terms "unit", "means", "part", and "member", which are described in the specification, mean a device of a comprehensive configuration that performs at least one function or operation.

Figure 1:
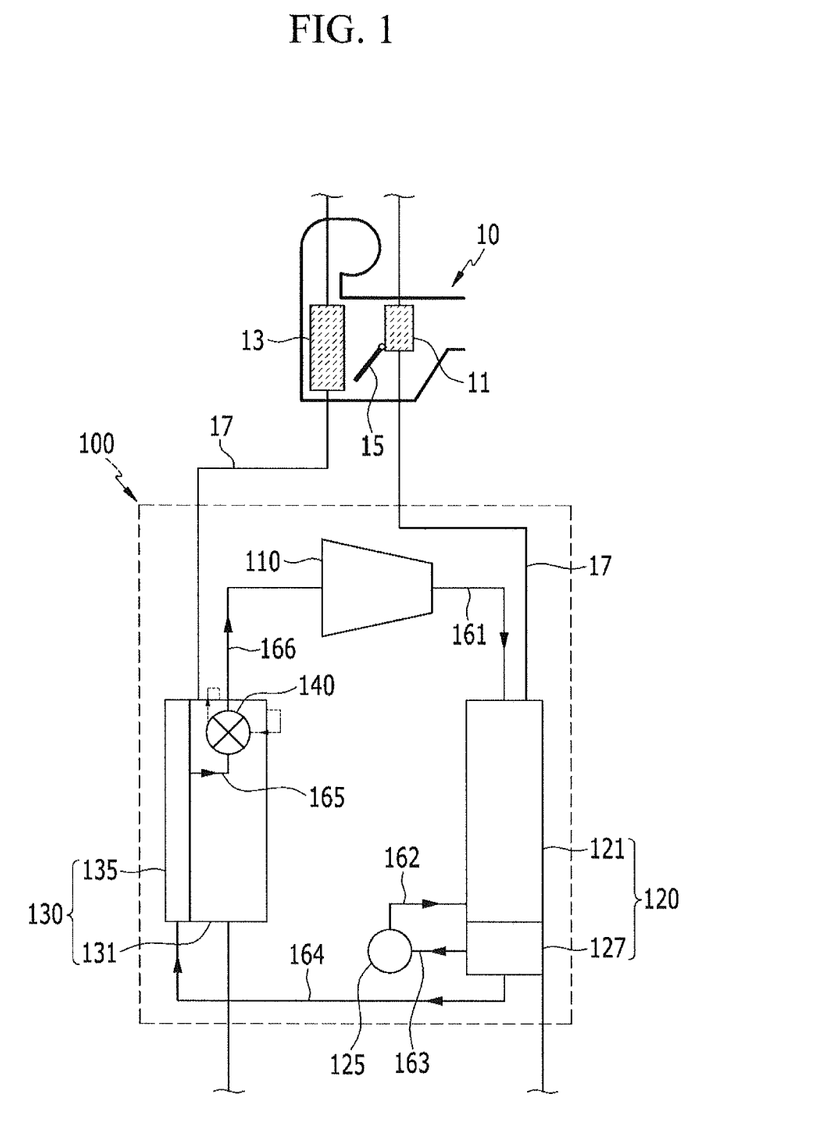
FIG. 1 is a schematic diagram of a CE module for a vehicle according to an exemplary embodiment of the present invention.
Figure 2:
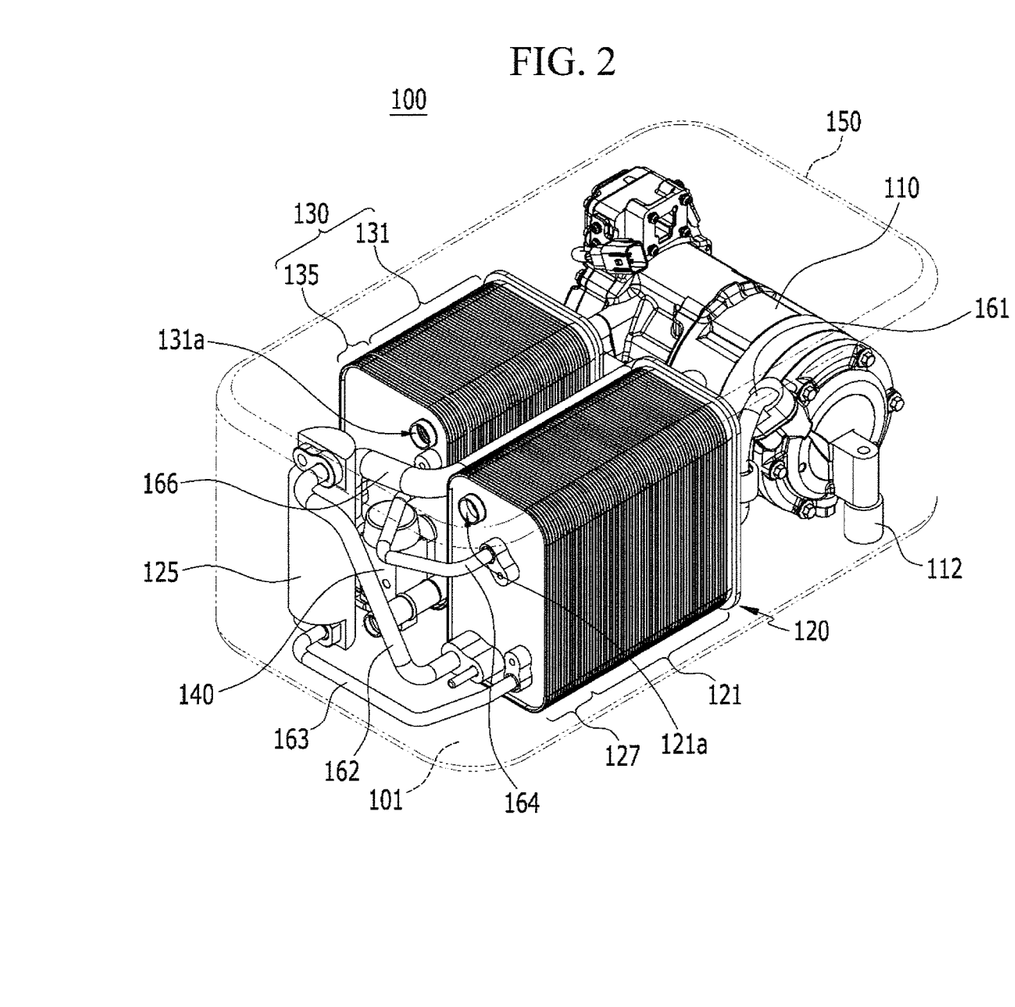
FIG. 2 is a perspective view of the CE module for a vehicle according to an exemplary embodiment of the present invention.
Figure 3:
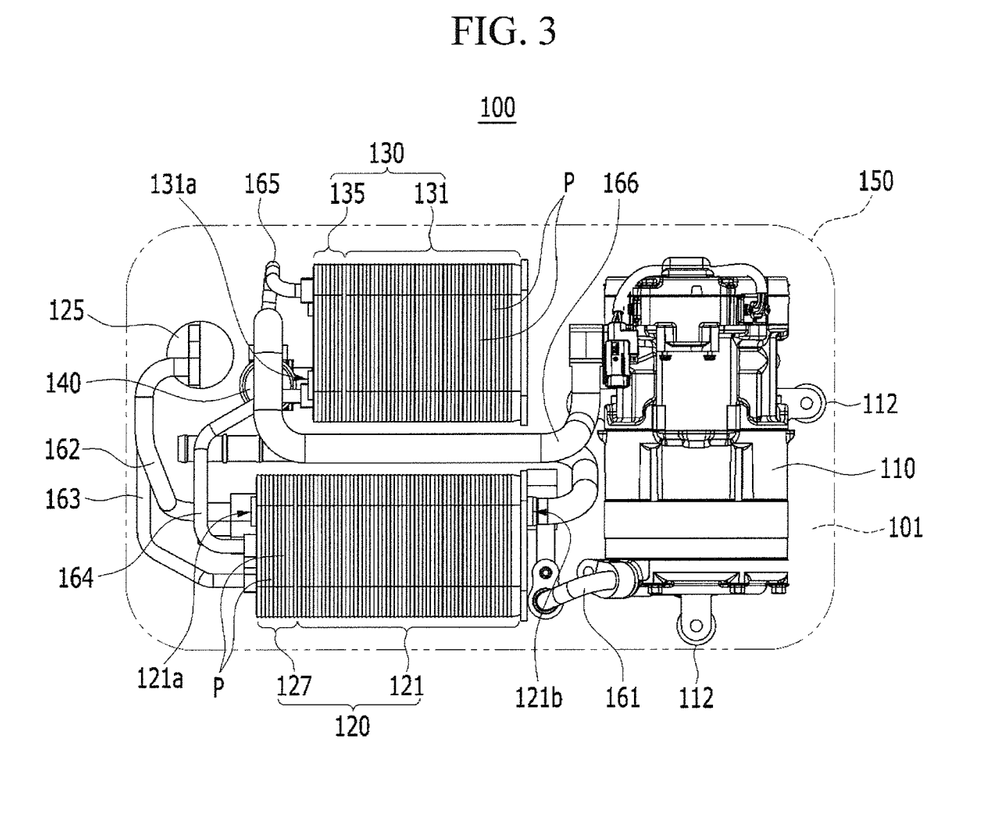
FIG. 3 is a plan view of the CE module for a vehicle according to an exemplary embodiment of the present invention.
Figure 4:
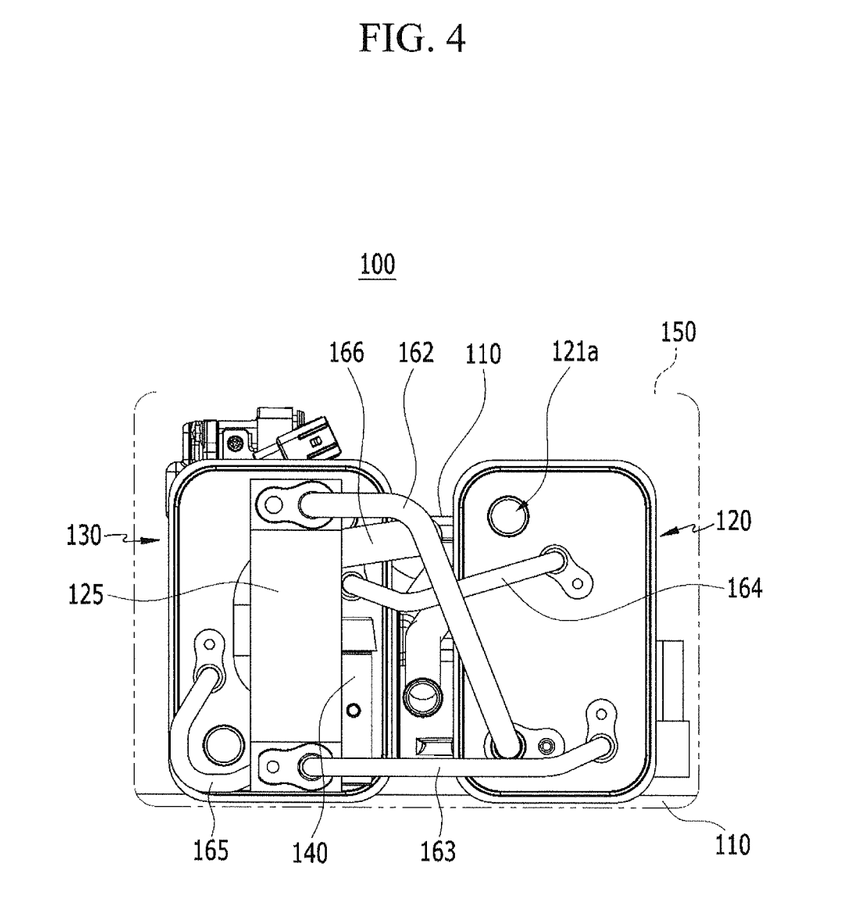
FIG. 4 is a side view of the CE module for a vehicle according to an exemplary embodiment of the present invention.

FIG. 1 is a schematic diagram of a CE module 100 for a vehicle according to an exemplary embodiment of the present invention.

The CE module 100 for a vehicle according to the exemplary embodiment of the present invention is applied to a heat pump system. The CE module 100 selectively transfers thermal energy generated in a refrigerant when the refrigerant is condensed and evaporated with cooling water to perform cooling or heating of the vehicle using only a low-temperature or a high-temperature cooling water.

Herein, the heat pump system may be applied to an electric vehicle. The heat pump system may include the CE module 100 according to the exemplary embodiment of the present invention together with a cooling device, a battery module, and a heating, ventilation, and air conditioning (HVAC) module 10.

The cooling device circulates the cooling water cooled by a radiator R through actuating a water pump to cool electric components.

The battery module may be connected to the cooling device, the cooling water may be circulated in the battery module through actuating the water pump, and the battery module may supply power to the electric components.

Referring to FIG. 1, in the exemplary embodiment, the heating, ventilation, and air conditioning (HVAC) module 10 includes an internal heater 11, a cooler 13, and an opening/closing door 15.

The internal heater 11 and the cooler 13 are connected to the CE module 100 through a cooling water pipe 17. In addition, the opening/closing door 15 is disposed between the internal heater 11 and the cooler 13. The opening/closing door 15 controls external air passing through the cooler 13 to selectively flow into the internal heater 11 according to cooling, heating, and heating/dehumidifying modes.

That is, the opening/closing door 15 is opened wherein the external air passing through the cooler 13 flows into the internal heater 11 in the heating mode of the vehicle. On the other hand, the internal heater 11 side of the opening/closing door 15 is closed wherein the external air cooled while passing through the cooler 13 immediately flows into the vehicle.

In addition, the centralized energy (CE) module 100 according to the exemplary embodiment of the present invention selectively transfer thermal energy generated when the refrigerant, which is circulated in the CE module 100, is condensed and evaporated with the cooling water and supplies each of the low-temperature or high-temperature cooling water which is transfer thermal energy to the HVAC module 10.

Herein, the refrigerant may be high-performance R152-a or R744 refrigerant.

When the heating mode of the vehicle is actuated, the high-temperature cooling water is supplied from the CE module 100 to the internal heater 11. On the other hand, when the cooling mode of the vehicle is actuated, the low-temperature cooling water is selectively supplied from the CE module 100 to the cooler 13.

In the exemplary embodiment, the CE module 100 includes a base plate 101, a compressor 110, a condenser 120, an evaporator 130, an expansion valve 140, and a cover housing 150.

In the exemplary embodiment, the base plate 101 is formed in a quadrangular plate shape.

The compressor 110 is mounted on one surface of the base plate 101. The compressor 110 compresses gas-state refrigerant discharged from the evaporator 130.

Herein, the compressor 110 may be connected to the condenser 120 through a first connection pipe 161.

Furthermore, a damper 112 may be mounted between the base plate 101 and the compressor 110.

The damper 112 may minimize a transfer of vibration and noise generated when the compressor 110 is actuated on the base plate 101. The damper 112 may include a rubber material as a primary material.

The condenser 120 is mounted on the base plate 101 at a location distanced from the compressor 110. The condenser 120 exchanges heat between the compressed refrigerant supplied from the compressor 110 with the cooling water which flows into the condenser 120 to condense the refrigerant.

Herein, the condenser 120 may be connected through the cooling water pipes 17, respectively wherein the cooling water flows into and is discharged from the condenser 120 and the respective cooling water pipes may be connected to the HVAC module 10.

Figure 5:
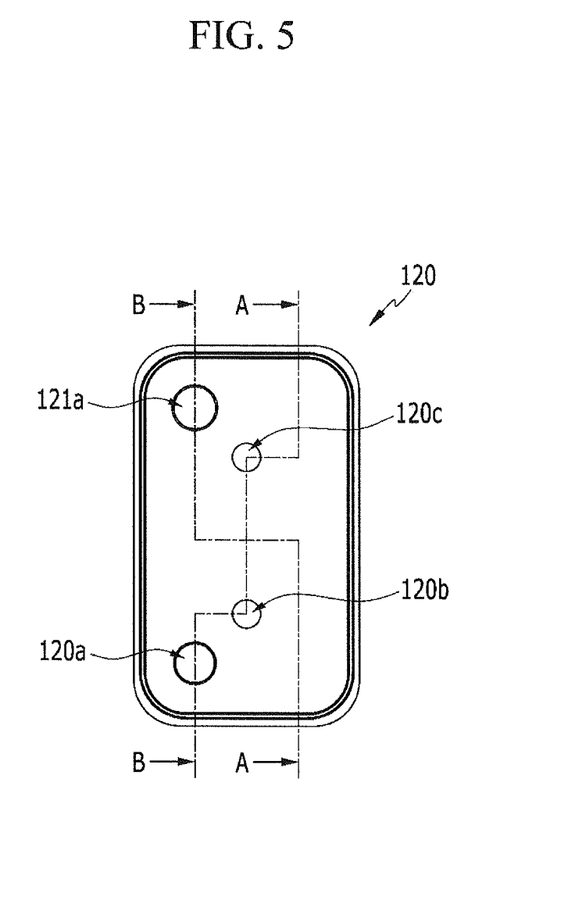
FIG. 5 is a side view of a condenser applied to the CE module for a vehicle according to an exemplary embodiment of the present invention.
Figure 6:
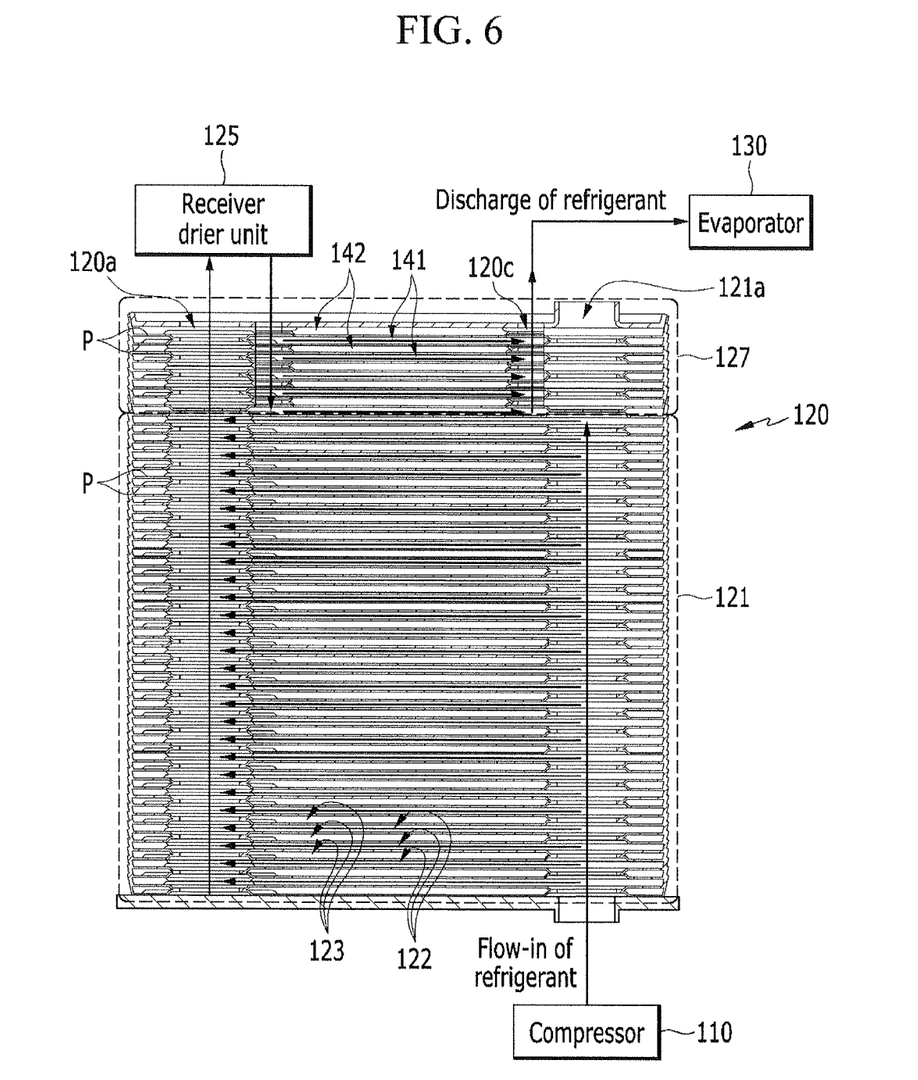
FIG. 6 is an operation state diagram illustrating the flow of refrigerant in the condenser as a cross-sectional view taken along line A-A of FIG. 5.
Figure 7:
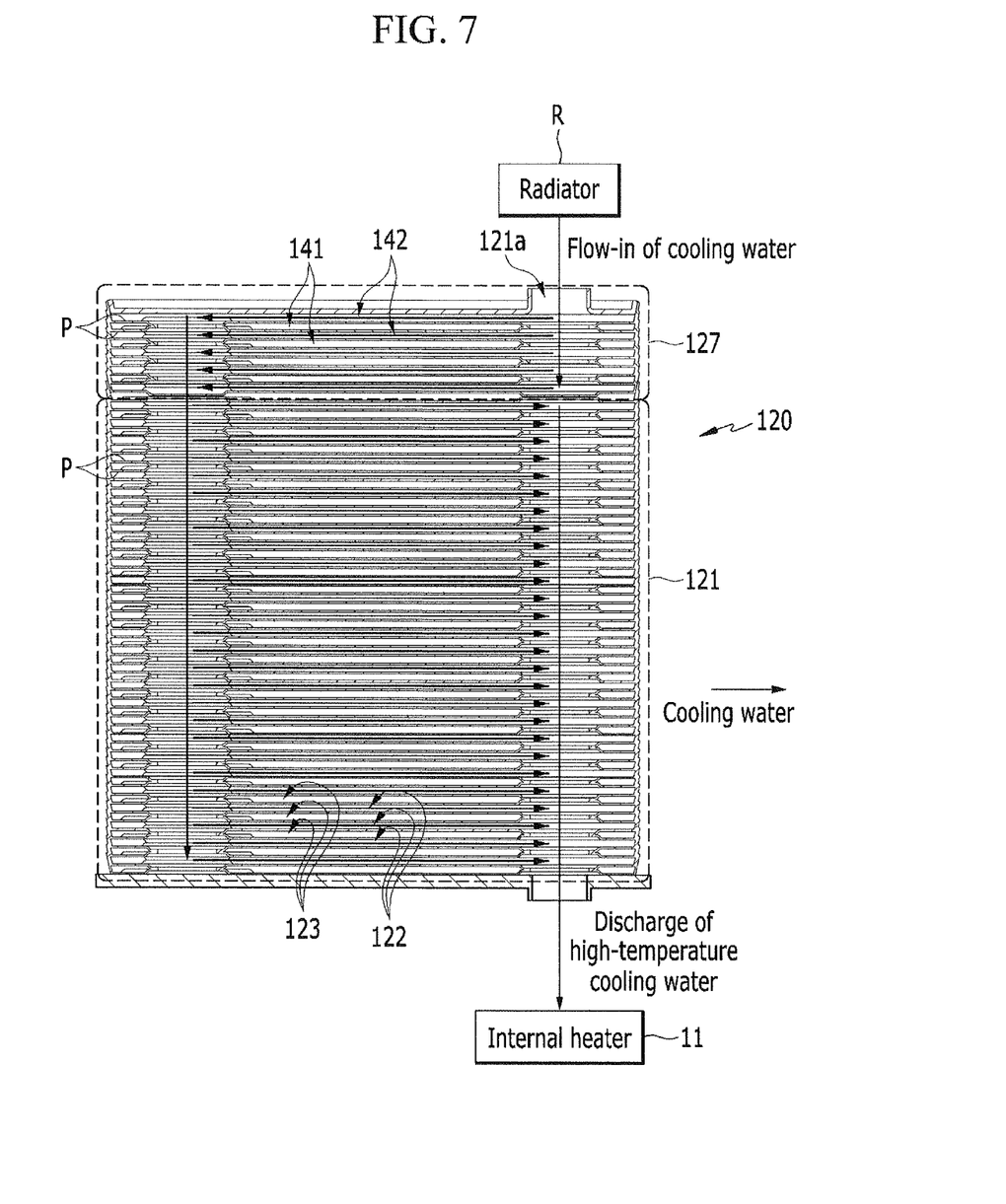
FIG. 7 is an operation state diagram illustrating the flow of cooling water as a cross-sectional view taken along line B-B of FIG. 5.

Referring to FIG. 5, FIG. 6, and FIG. 7, in the exemplary embodiment, the condenser 120 includes a condensing device 121.

In the condensing device 121, multiple plates P are configured to be stacked to form multiple first and second paths 122 and 123 disposed alternatively to each other, respectively. The condensing device 121 exchanges heat between the refrigerant passing through the first paths 122 and the cooling water passing through the second paths 123.

Herein, a first cooling water inflow hole 121*a* and a first cooling water discharge hole 121*b* are formed on one surface and the other surface of the condensing device 121, respectively based on a longitudinal direction of the condensing device 121.

The first cooling water inflow hole 121*a* is connected to the radiator R through the cooling water pipe 17. In addition, the first cooling water discharge hole 121*b* is connected to the HVAC module 10 through the cooling water pipe 17.

The first cooling water inflow hole 121*a* is connected to the first cooling water discharge hole 121*b* through each of the second paths 123 in the condensing device 121. As a result, the cooling water is circulated through the first cooling water inflow hole 121*a* and the first cooling water discharge hole 121*b*.

Herein, the condenser 120 may be connected to a receiver drier device 125 which is separately provided in the cover housing 150 for gas-liquid separation of the refrigerant condensed while passing through an internal portion of the condenser 120 while removing moisture of the refrigerant.

The receiver drier device 125 is formed in a cylindrical shape and may have a drying agent therein. Furthermore, the receiver drier device 125 may be disposed to be erected based on the longitudinal direction thereof.

Meanwhile, the condenser 120 may further include a sub-condensing device 127.

The sub-condensing device 127 is integrally formed with the condensing device 121. In the sub-condensing device 127, multiple plates P are configured to be integrally stacked to form multiple seventh and eighth paths 141 and 142 disposed alternatively to each other.

As a result, the sub-condensing device 127 exchanges heat between the refrigerant supplied from the receiver driver device 125 while passing through the second seventh paths 141 and the cooling water passing through the eighth paths 142.

That is, when the refrigerant, which is cooled and primarily condensed through the condenser 120, flows into the sub-condensing device 127 through the receiver driver device 125, the sub-condensing device 127 may cool and secondarily condense the refrigerant through mutual heat transfer with the cooling water.

Herein, the low-temperature cooling water supplied from the radiator R first passes the second paths 142 of the sub-condensing device 127.

As a result, after the refrigerant passing through the condenser 120 is primarily condensed while passing through the condensing device 121, gaseous refrigerant, moisture, and foreign materials are removed from the refrigerant while the refrigerant passes through the receiver drier device 125.

As such, the refrigerant flows into the sub-condensing device 127 and is additionally cooled together with the low-temperature cooling water which flows into the sub-condensing device 127 earlier to enhance cooling efficiency, increasing condensation rate.

Herein, it is referred to as an exemplary embodiment that the sub-condensing device 127 is integrally provided in the condenser 120 in the exemplary embodiment, but the present invention is not limited thereto. For instance, the sub-condensing device 127 may not be integrally provided in the condenser 120 as necessary.

Meanwhile, the condenser 120 is connected to the receiver drier device 125 through second and third connection pipes 162 and 163.

Herein, a first refrigerant discharge hole 120a on which the second connection pipe 162 is mounted is formed in the condenser 120 with the first cooling water inflow hole 121a to discharge the refrigerant to the receiver drier device 125.

Furthermore, a first refrigerant inflow hole 120b, configured for making the refrigerant discharged from the receiver drier device 125 flow into the sub-condensing device 127, is formed in the condenser 120 at a location distanced from the first refrigerant discharge hole 120a.

In addition, a second refrigerant discharge hole 120c may be formed in the condenser 120 wherein a fourth connection pipe 164 for connection with the evaporator 130 is mounted at a location distanced from the first refrigerant inflow hole 120b.

The condenser 120, configured as such, exchanges heat between the flow-in refrigerant with the cooling water to condense the refrigerant, and supplies the thermal energy generated when the refrigerant is condensed to the cooling water, increasing the temperature of the cooling water.

Accordingly, the high-temperature cooling water which undergoes heat transfer while passing through the condenser 120 is supplied to the internal heater 11 of the HVAC module 10 to heat the internal of the vehicle when the heating mode of the vehicle is actuated.

The condenser 120, configured as such, may be formed as a water-cooled heat exchanger in which the cooling water is circulated.

As a result, the refrigerant supplied from the compressor 110 is condensed through heat transfer with the cooling water while passing through the condensing device 121. As such, the gaseous refrigerant, moisture, and foreign materials are removed from the refrigerant while the refrigerant passes through the receiver drier device 125 through the second and third connection pipes 162 and 163.

As such, the refrigerant passing through the receiver drier device 125 may be additionally condensed while passing through the sub condensing device 127.

Meanwhile, the CE module 100 may further include an accumulator instead of the receiver drier device 125.

That is, when the receiver drier device 125 is not provided in the condenser 120, the accumulator may be provided instead of the receiver drier device 125.

In the exemplary embodiment, the evaporator 130 is mounted on the base plate 101 at a location distanced from the condenser 120. The evaporator 130 evaporates the refrigerant supplied from the expansion valve 140, which is integrally mounted, through heat transfer with the flow-in cooling water and supplies the evaporated refrigerant to the compressor 110.

An overcooling heat exchange device 135 may be integrally provided in the evaporator 130, which is configured to overcool the refrigerant supplied from the condenser 120 through mutual heat transfer with low-temperature low-pressure gaseous refrigerant passing through the evaporator 130, and supplies the overcooled refrigerant to the expansion valve 140.

Herein, the condenser 120 may be connected to the overcooling heat exchange device 135 through the fourth connection pipe 164 mounted on the second refrigerant discharge hole 120c.

That is, the evaporator 130 may include an evaporating device 131 and the overcooling heat exchange device 135 as illustrated in FIG. 2, FIG. 3, FIG. 8, FIG. 9, FIG. 10, and FIG. 11.

Figure 8:
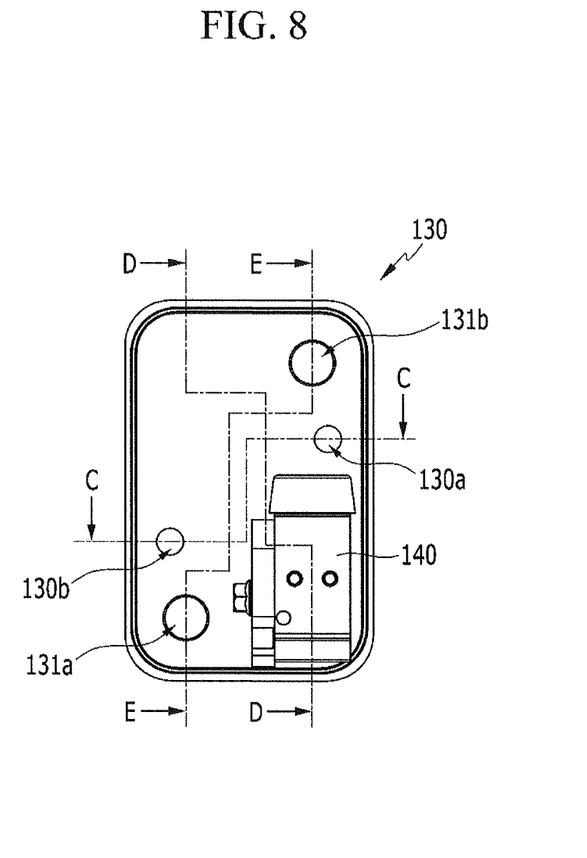
FIG. 8 is a side view of an evaporator applied to the CE module for a vehicle according to an exemplary embodiment of the present invention.
Figure 10:
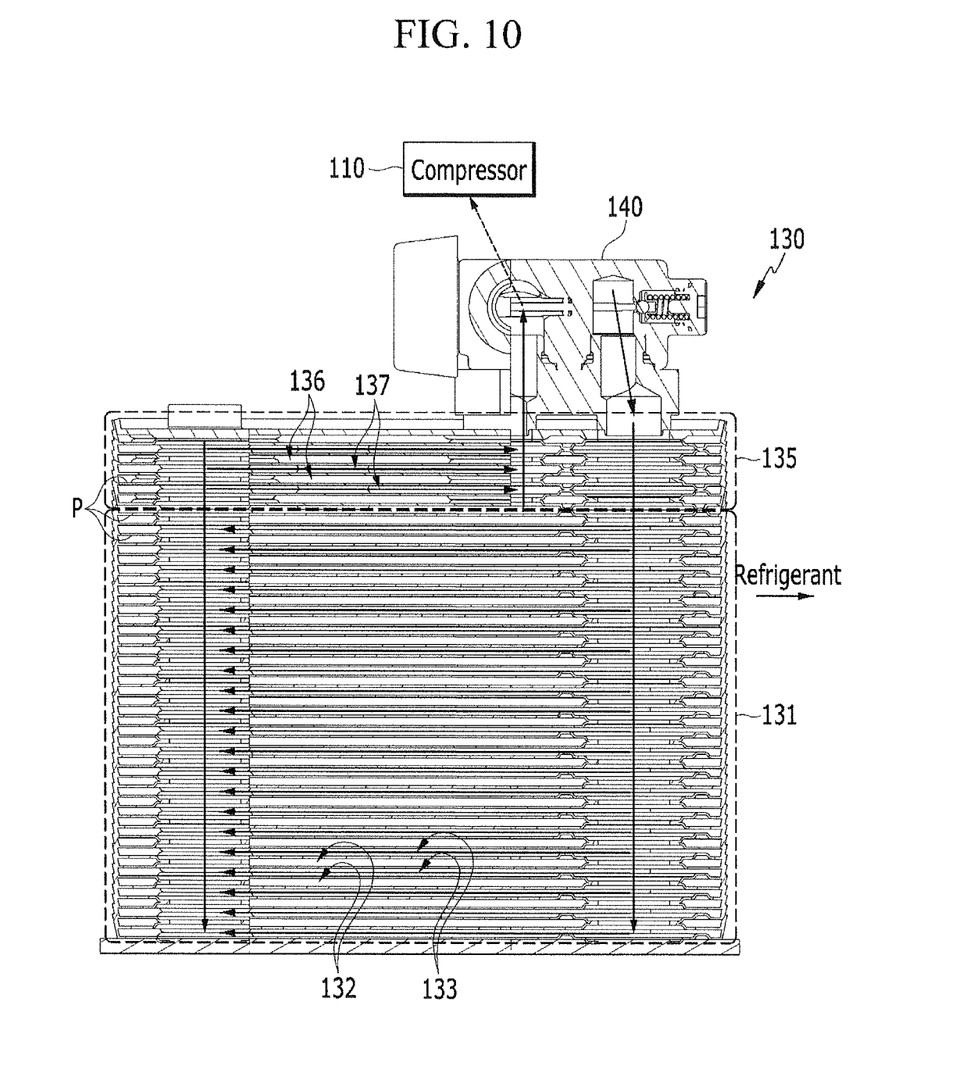
FIG. 10 is an operation state diagram illustrating the flow of the refrigerant in the evaporator as a cross-sectional view taken along line D-D of FIG. 8.
Figure 11:
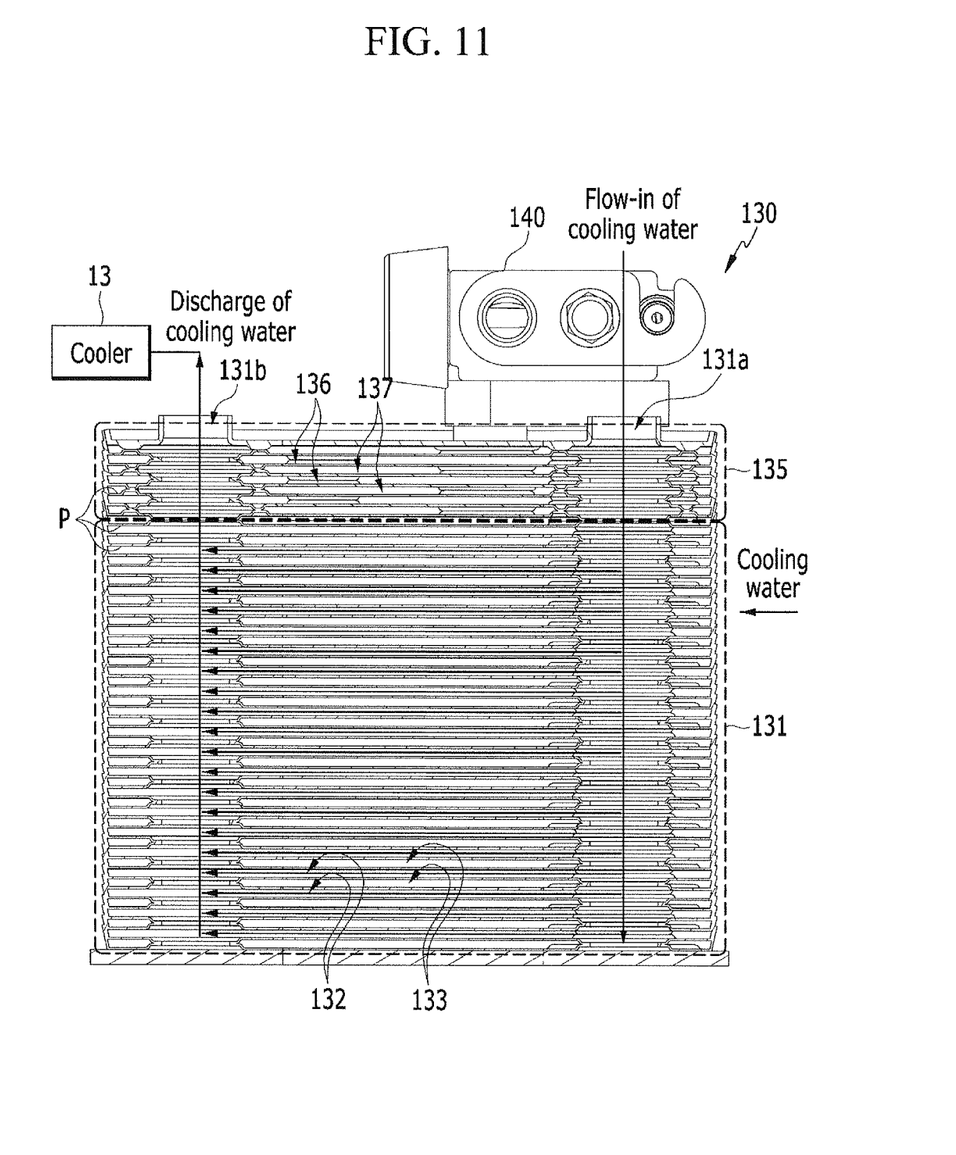
FIG. 11 is an operation state diagram illustrating the flow of the cooling water in the evaporator as a cross-sectional view taken along line E-E of FIG. 8.

First, in the evaporating device 131, multiple plates P are configured to be stacked to form multiple third and fourth paths 132 and 133 disposed alternatively to each other, respectively. The evaporating device 131 exchanges heat between the refrigerant passing through the third paths 132 and the cooling water passing through the fourth paths 133.

Figure 9:
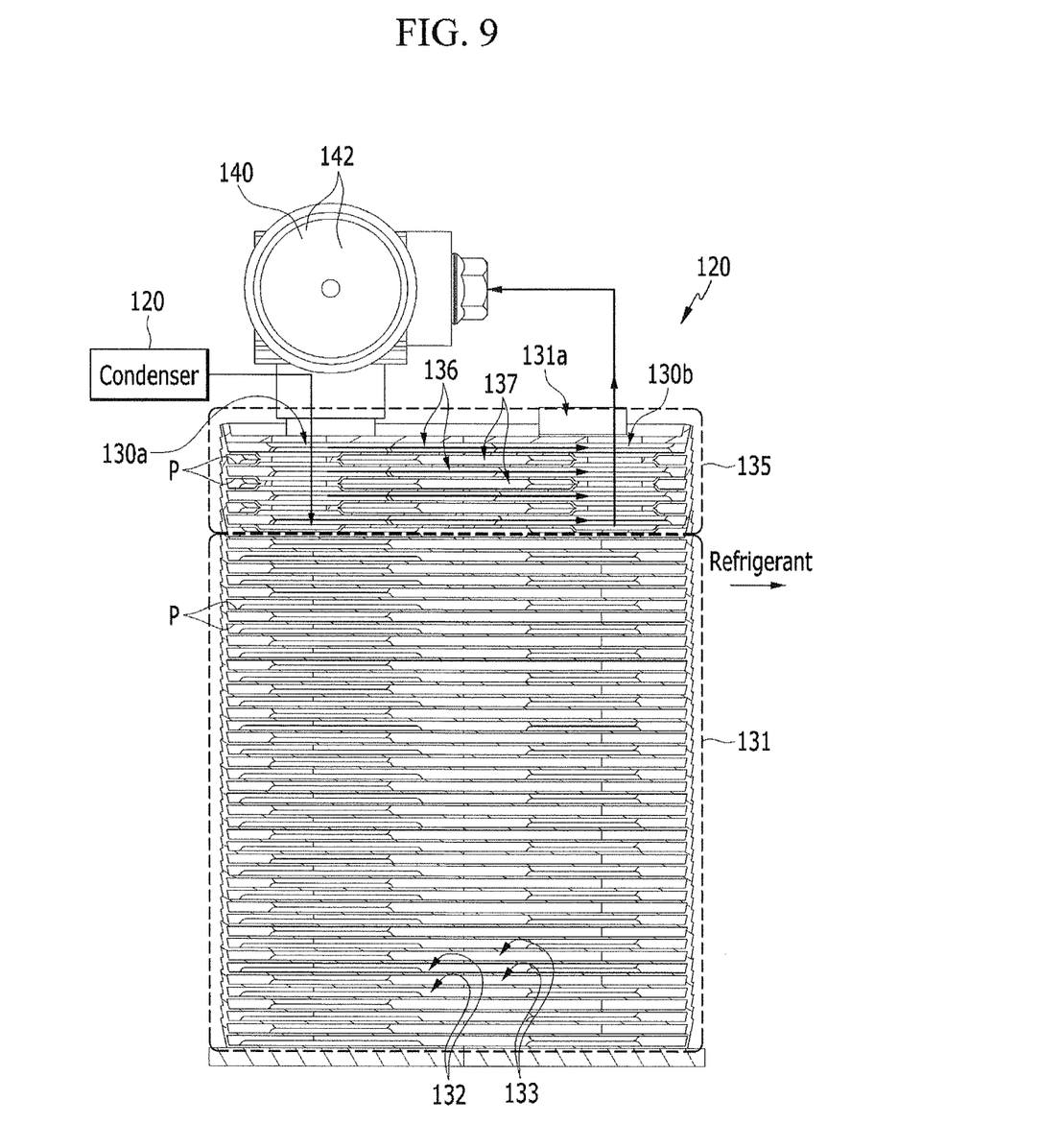
FIG. 9 is an operation state diagram illustrating the flow of the refrigerant in an overcooling heat-exchange device as a cross-sectional view taken along line C-C of FIG. 8.

In addition, the overcooling heat exchange device 135 is integrally formed above the evaporating device 131. In the overcooling heat exchange device 135, multiple plates P are configured to be stacked to form multiple fifth and sixth paths 136 and 137 disposed alternatively to each other, respectively.

The overcooling heat exchange device 135 may flow the low-temperature and low-pressure gaseous refrigerant supplied from the evaporator 131 to the sixth paths 137 and flow the condensed refrigerant supplied from the condenser 120 to the fifth paths 136.

That is, the refrigerant discharged from the condenser 120 passes through the overcooling heat exchange device 135 and thereafter, flows into the expansion valve 140. As such, the refrigerant may flow into the evaporating device 131 while expanding in the expansion valve 140.

As a result, the refrigerant passing through the condenser 120 flows into the overcooling heat exchange device 135 and, in the provided case, the refrigerant is overcooled through heat transfer with the low-temperature low-pressure gaseous refrigerant which flows from the evaporating device 131 to enhance the cooling efficiency, increasing the condensation rate of the refrigerant.

Meanwhile, in the evaporator 130, a second cooling water inflow hole 131a and a second cooling water discharge hole 131b are formed on both edge portions opposite to each other on a first surface on which the expansion valve 140 is mounted.

The second cooling water inflow hole 131a and the second cooling water discharge hole 131b may be connected to the evaporator 131 by penetrating the overcooling heat exchange device 135.

That is, the second cooling water inflow hole 131a and the second cooling water discharge hole 131b may be formed on each corner portion in a diagonal direction on one surface of the evaporating device 131, and the cooling water pipes 17 may be mounted on the second cooling water inflow hole 131a and the second cooling water discharge hole 131b, respectively.

The second cooling water inflow hole 131a is connected to the second cooling water discharge hole 131b through each of the fourth paths 133 in the evaporating device 131. As a result, the cooling water is circulated through the second cooling water inflow hole 131a and the second cooling water discharge hole 131b.

Furthermore, a second refrigerant inflow hole 130a, configured for flowing the refrigerant supplied from the condenser 120 into the overcooling heat exchange device 135, and a third refrigerant discharge hole 130b, configured for discharging the refrigerant passing through the fifth paths 136, may be formed in the evaporator 130.

The fourth connection pipe 164 may be mounted on the second refrigerant inflow hole 130a, and a fifth connection pipe 165 connected to the expansion valve 140 may be mounted on the third refrigerant discharge hole 130b.

The evaporator 130, configured as such, exchanges heat between the refrigerant which flows from the overcooling heat exchange device 135 with the cooling water to evaporate the refrigerant, and supplies the low-temperature thermal energy generated when the refrigerant is evaporated to cool the cooling water.

Accordingly, the low-temperature cooling water, which undergoes heat transfer while passing through the evaporator 130, is supplied to the cooler 13 of the HVAC module 10 to cool the internal of the vehicle when the cooling mode of the vehicle is actuated.

The condenser 130, configured as such, may be formed as the water-cooled heat exchanger in which the cooling water is circulated.

In the exemplary embodiment, the expansion valve 140 may be integrally mounted on the evaporator 130. The expansion valve 140 may be connected to the overcooling heat exchanger 135 through the fifth connection pipe 165 and connected to the compressor 110 through a sixth connection pipe 166.

As a result, the expansion valve 140 receives and expands the refrigerant passing through the overcooling heat exchange device 135. Herein, the expansion valve 140 is directly connected to the evaporating device 131 and flows the expanded refrigerant into the third paths 132.

The refrigerant evaporated while passing through the evaporating device 131 passes through the expansion valve 140 and flows into the compressor 110 through the sixth connection pipe 166.

In the above case, the expansion valve 140 may connect the sixth connection pipe 166 and the evaporating device 131 through a separate path formed therein.

The expansion valve 140 may be configured as a mechanical type or an electronic type.

In addition, the cover housing 150 is mounted on the base plate 101 wherein the compressor 110, the condenser 120, and the evaporator 130 are disposed in the cover housing 150.

In addition, the cover housing 150 may prevent the compressor 110, the condenser 120, the evaporator 130, and the expansion valve 140 mounted on the base plate 101 from being exposed to the external environment.

As described above, according to the exemplary embodiment of the present invention, when the CE module 100 for a vehicle is applied, the thermal energy generated from refrigerant when the refrigerant is condensed and evaporated is selectively exchanged, and the temperature of the internal of the vehicle is controlled using each of the low-temperature or high-temperature cooling water which undergoes heat transfer to simplify a whole system and a layout of the connection pipe in which the refrigerant is circulated.

Furthermore, the CE module 100 for a vehicle can enhance operational efficiency using high-performance R152-a or R744 refrigerant, and prevent noise, vibration, and operational instability as compared with an air conditioner device in the related art.

Furthermore, manufacturing cost can be reduced and a weight can be reduced through modularization of an apparatus, and spatial utilization can be enhanced.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A centralized energy (CE) module for a vehicle, the CE module comprising:
   a base plate;
   a compressor mounted on the base plate and compressing refrigerant;
   a condenser mounted on the base plate at a location distanced from the compressor configured to exchange heat between the compressed refrigerant supplied from the compressor with cooling water which flows into the condenser to condense the refrigerant; and
   an evaporator mounted on the base plate at a location distanced from the condenser and evaporating the refrigerant supplied from an expansion valve connected to the compressor, which is integrally mounted, through heat transfer with the cooling water which flows into the evaporator, and supplying the evaporated refrigerant to the compressor through the expansion valve, wherein in the evaporator, an overcooling heat exchange device is integrally provided, configured to overcool the refrigerant supplied from the condenser through mutual heat transfer with low-temperature low-pressure gaseous refrigerant passing through the evaporator, and supplies the overcooled refrigerant to the expansion valve and the compressor, wherein the evaporator includes an evaporating device having a plurality of third and fourth paths disposed alternatively to each other therein by stacking a plurality of plates and exchanging heat between the refrigerant passing through the third paths and the cooling water passing through the fourth paths, and wherein the overcooling heat exchange device is integrally formed in the evaporating device and has a plurality of fifth and sixth paths disposed alternatively to each other, respectively therein by stacking a plurality of plates.

2. The CE module of claim 1, wherein
the condenser includes a condensing device having a plurality of first and second paths disposed alternatively to each other, respectively therein, by stacking a plurality of plates and exchanging heat between the refrigerant passing through the first paths and the cooling water passing through the second paths.

3. The CE module of claim 2, wherein the condenser further includes a sub-condensing device having a plurality of seventh and eighth paths disposed alternatively to each other therein by integrally stacking a plurality of plates and exchanging heat between the refrigerant passing through the seventh paths and the cooling water passing through the eighth paths.

4. The CE module of claim 1, wherein
the condenser is connected to a receiver drier device configured for gas-liquid separation of the refrigerant which is condensed while passing through an internal portion of the condenser and removes moisture of the refrigerant.

5. The CE module of claim 4, wherein
the compressor is connected to the condenser through a first connection pipe,
the condenser is connected to the receiver drier device through second and third connection pipes,
the condenser is connected to the overcooling heat exchange device through a fourth connection pipe, and
the expansion valve is connected to the overcooling heat exchange device through a fifth connection pipe and connected to the compressor through a sixth connection pipe.

6. The CE module of claim 1, wherein the overcooling heat exchange device flows low-temperature low-pressure gaseous refrigerant supplied from the evaporating device to the sixth paths and flows the condensed refrigerant supplied from the condenser to the fifth paths.

7. The CE module of claim 6, wherein the cooling water flowing into the condenser first passes through the sub-condensing device and thereafter flows into the condensing device.

8. The CE module of claim 1, wherein the refrigerant discharged from the condenser passes through the overcooling heat exchange device and thereafter flows into the evaporator through the expansion valve.

9. The CE module of claim 1, wherein the evaporator and the condenser are connected to each other through cooling water pipes wherein the cooling water flows into and is discharged from the evaporator and the condenser, and
a respective cooling water pipe is connected to a heating, ventilation, and air conditioning (HVAC) module.

10. The CE module of claim 9, wherein high-temperature cooling water which transfers heat while passing through the condenser is supplied to the HVAC module to heat an internal of the vehicle when a heating mode of the vehicle is actuated.

11. The CE module of claim 9, wherein low-temperature cooling water which transfers heat while passing through the evaporator is supplied to the HVAC module to cool the internal of the vehicle when a cooling mode of the vehicle is actuated.

12. The CE module of claim 1, wherein the condenser and the evaporator are formed as a water-cooled heat exchanger in which the cooling water is circulated.

13. The CE module of claim 1, wherein the refrigerant is R152-a or R744 refrigerant.

14. The CE module of claim 1, wherein on the base plate, a cover housing is mounted so that the compressor, the condenser, and the evaporator are disposed in the cover housing.

15. The CE module of claim 1, wherein a damper is disposed between the base plate and the compressor.

* * * * *